US009473891B2

(12) United States Patent
Colby et al.

(10) Patent No.: US 9,473,891 B2
(45) Date of Patent: Oct. 18, 2016

(54) MECHANISM FOR FACILITATING DYNAMIC DETECTION AND COMMUNICATION OF GEO-LOCATIONS FOR DEVICES

(71) Applicants: Robert A. Colby, Granite Bay, CA (US); Jaideep Moses, Portland, OR (US); Mats Agerstam, Portland, OR (US); Roy Ramon, Hod Hashron (IS); Raguraman Barathalwar, Portland, OR (US)

(72) Inventors: Robert A. Colby, Granite Bay, CA (US); Jaideep Moses, Portland, OR (US); Mats Agerstam, Portland, OR (US); Roy Ramon, Hod Hashron (IS); Raguraman Barathalwar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/129,958

(22) PCT Filed: Sep. 11, 2013

(86) PCT No.: PCT/US2013/059237
§ 371 (c)(1),
(2) Date: Dec. 28, 2013

(87) PCT Pub. No.: WO2015/038114
PCT Pub. Date: Mar. 19, 2015

(65) Prior Publication Data
US 2015/0072704 A1    Mar. 12, 2015

(51) Int. Cl.
*H04W 4/02* (2009.01)
*H04W 4/00* (2009.01)

(52) U.S. Cl.
CPC ............ *H04W 4/023* (2013.01); *H04W 4/006* (2013.01)

(58) Field of Classification Search
None
See application file for complete search history.

(56) References Cited

U.S. PATENT DOCUMENTS

| 8,694,019 | B2 * | 4/2014 | Vuori ................... H04W 4/028 |
| | | | 455/456.1 |
| 2005/0233748 | A1 * | 10/2005 | Robinson et al. ............ 455/440 |
| 2009/0058638 | A1 * | 3/2009 | Kanagala et al. ....... 340/539.13 |
| 2010/0279713 | A1 * | 11/2010 | Dicke ........................... 455/457 |
| 2012/0172062 | A1 * | 7/2012 | Altman et al. ................ 455/457 |

(Continued)

FOREIGN PATENT DOCUMENTS

WO    WO-2013-109793    7/2013

OTHER PUBLICATIONS

PCT/US2013/059237, "Notification of Transmittal of the International Search Report and the Written Opinion of the International Searching Authority, or the Declaration" mailed Jun. 26, 2014, pp. 14.

*Primary Examiner* — Lester Kincaid
*Assistant Examiner* — Daniel G Bassett
(74) *Attorney, Agent, or Firm* — Blakely, Sokoloff, Taylor & Zafman LLP

(57) ABSTRACT

A mechanism is described for facilitating detection and communication of geo-locations for devices according to one embodiment. A method of embodiments, as described herein, includes tracking, at a first smart device, one or more devices including a second smart device, and first and second smart devices including a computing device, and establishing a first connection with the second smart device, establishing further comprising exchanging first location data between the first smart device and the second smart device, establishing further including communicating a first current location associated with the first smart device to the second smart device. The method may further include identifying a second current location associated with the second smart device. The second current location may be initially recorded and iteratively rewritten at a first local memory of the first smart device.

18 Claims, 6 Drawing Sheets

(56) References Cited

U.S. PATENT DOCUMENTS

| | | | |
|---|---|---|---|
| 2013/0178162 A1* | 7/2013 | Neumeyer | H04W 4/008 455/41.2 |
| 2013/0225205 A1* | 8/2013 | Haney | 455/456.3 |
| 2014/0084060 A1* | 3/2014 | Jain | G06Q 10/087 235/385 |
| 2014/0135042 A1* | 5/2014 | Buchheim | H04W 4/023 455/456.6 |
| 2014/0162701 A1* | 6/2014 | Jellinek | H04W 4/023 455/456.6 |
| 2014/0191868 A1* | 7/2014 | Ortiz | H04W 4/028 340/539.13 |
| 2014/0213301 A1* | 7/2014 | Evans | H04W 4/023 455/456.3 |
| 2015/0126234 A1* | 5/2015 | Rodriguez | H04W 4/02 455/457 |
| 2016/0142876 A1* | 5/2016 | Klein | H04W 4/023 455/456.2 |

* cited by examiner

MECHANISM FOR FACILITATING DYNAMIC DETECTION AND COMMUNICATION OF GEO-LOCATIONS FOR DEVICES

CROSS-REFERENCE TO RELATED APPLICATION

This patent application is a U.S. National Phase Application under 35 U.S.C. §371 of International Application No. PCT/US2013/059237, filed Sep. 11, 2013, entitled MECHANISM FOR FACILITATING DYNAMIC DETECTION AND COMMUNICATION OF GEO-LOCATIONS FOR DEVICES by Colby Robert, et al., the benefit and priority are claimed thereof and the entire contents of which are incorporated herein by reference.

FIELD

Embodiments described herein generally relate to computer programming More particularly, embodiments relate to a mechanism for facilitating dynamic detection and communication of geo-locations for devices.

BACKGROUND

It is a common occurrence for individuals to forget where they last parked their car, left their cellular phone, put their keys, etc., which often leads to hours and even days of struggle and anguish to locate the forgotten item; while sometimes, the item is permanently lost. Most conventional solutions to this problem require an actual knowledge of the last location. For example, certain software applications require a computing device to be connected over a network for the application to work, while other applications send alerts (e.g., voice alerts) which the users have to listen to or know about for the applications to work. None of these existing solutions are practical or without problems.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for facilitating dynamic detection and communication of geo-location (e.g., last known geo-location, current geo-location, etc.) for devices and further facilitating automatic and dynamic updating of a device's geo-location upon detecting the proximate separation of the device (e.g., lost device or device or interest) from another device (e.g., detecting device) and/or devices (e.g., peer or participating device). Embodiments further provide for automatically identifying a point at which a current/detecting device is separated from a device of interest, and recording the relative location or geo-location using, for example, the device's Location Engine (e.g., Global Positioning System (GPS), trilateration engine, fingerprinting, etc.). Embodiments further provide for leveraging other connected "peer" devices for determining whether they had last "seen" (e.g., detected) the now lost device or if they can still detect the lost device. In one embodiment, this leveraging may be performed over cloud (e.g., cloud network) to extend where the search for the lost device can be performed by any one or more of the "peer" devices, such as proxy or participating devices performing device location discovery of the device of interest on behalf of the detecting device.

For example and in one embodiment, various connectivity, proximity, and location management techniques (e.g., Intel®'s Common Connectivity Framework (CCF), Bluetooth, Bluetooth low energy (BLE) or Bluetooth Smart, WiFi proximity, Radio Frequency Identification (RFID), etc.) may be applied depending, for example, on the nature of the device (e.g., a smartphone versus a dumb phone, etc.), proximity/distance between devices, (e.g., a few feet versus several thousand miles, etc., but it is to be noted that embodiments are not limited to any particular technique. It is to be further noted that the use of certain names or terms, such as "Common Connectivity Framework", "CCF", "location engine", "peer", "MyDevice", "track me", "FindMe", "geo-location", "location trust", etc., should not be read to limit embodiments to software or devices that carry that label in products or in literature external to this document.

Figure 1:
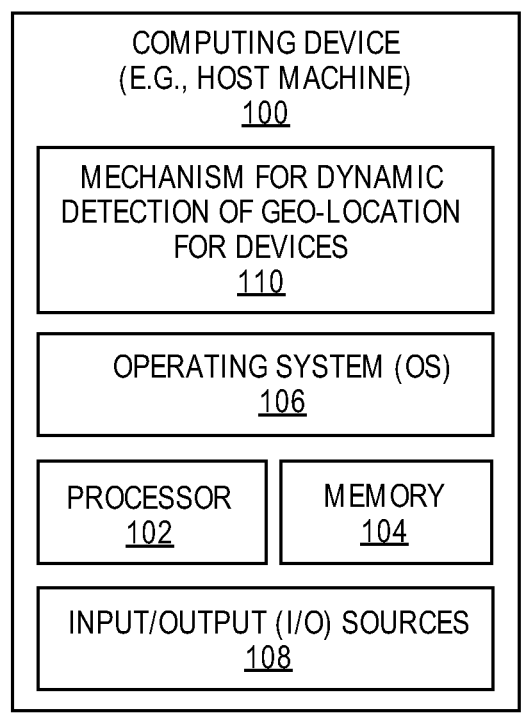
FIG. 1 illustrates a mechanism for dynamic detection and communication of geo-location for devices employed at a computing device according to one embodiment.

FIG. 1 illustrates a mechanism for dynamic detection and communication of geo-location for devices 110 employed at a computing device 100 according to one embodiment. Computing device 100 serves as a host machine for employing mechanism for dynamic detection of geo-location for devices ("geo-location mechanism") 110 for facilitating dynamic detection and communication of geo-locations (e.g., last geo-location, current geo-location, etc.) for any number and type of devices, including smart devices and dumb devices. Computing device 100 may include mobile computing devices, such as cellular phones including smartphones (e.g., iPhone® by Apple®, BlackBerry® by Research in Motion®, etc.), personal digital assistants (PDAs), etc., tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "host", "server", "memory server", "machine", "device", "computing device", "computer", "computing system", and the like, may be used interchangeably throughout this document.

Figure 2A:
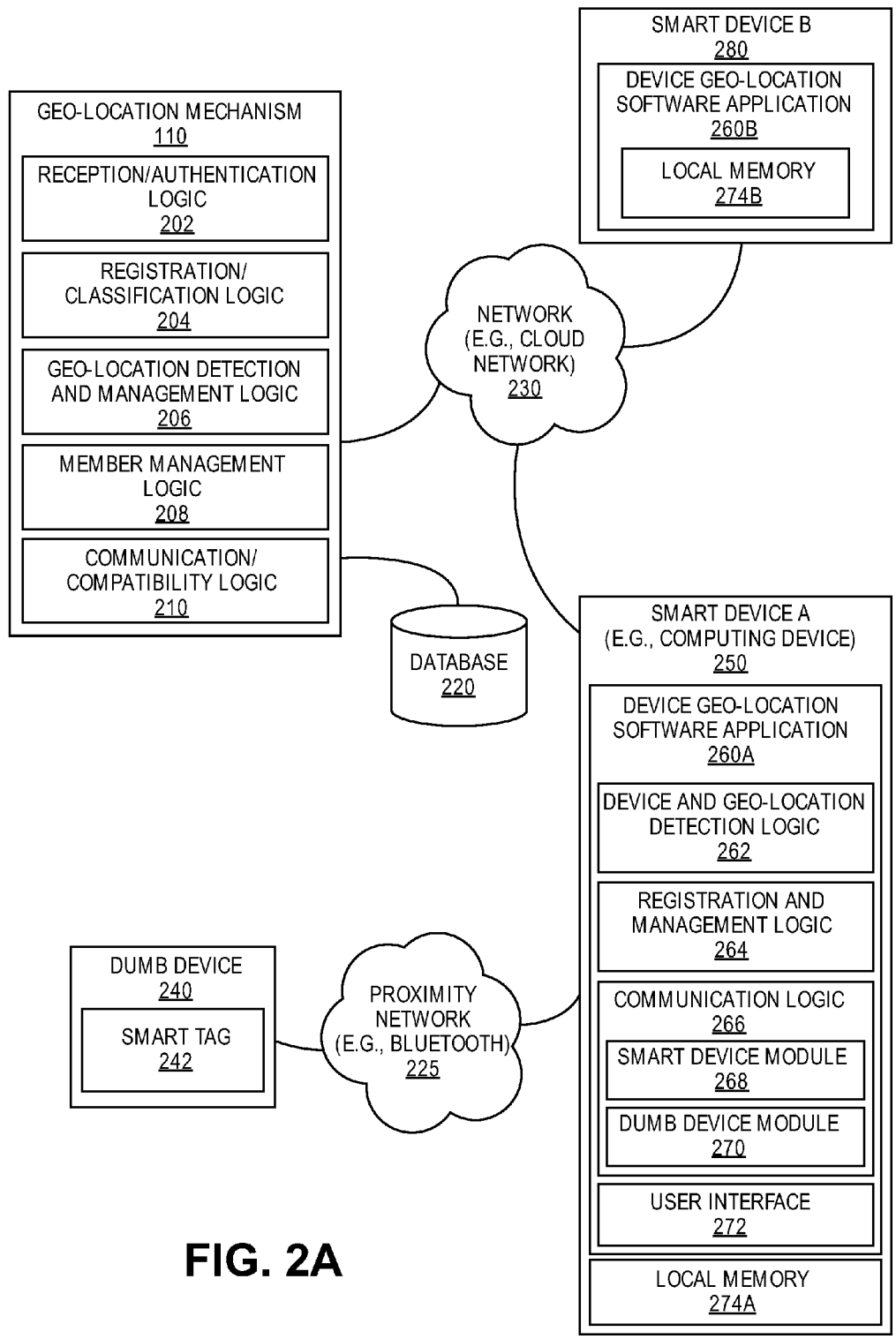
FIG. 2A illustrates a mechanism for dynamic detection and communication of geo-location for devices according to one embodiment.

FIG. 2A illustrates a mechanism for dynamic detection and communication of geo-location for devices 110 according to one embodiment. In one embodiment, geo-location mechanism 110 may reside at a computing device, such as host machine 100 of FIG. 1, and include a number of components, such as reception/authentication logic 202, registration/classification logic 204, geo-location detection and management logic 206, member management logic 208, and communication/compatibility logic 210. Geo-location mechanism 110 may be in communication with one or more databases, such as database 220, and one or more computing devices, such as smart device A 250 and smart device B 280, over one or more networks, such as network 230 (e.g., cloud network, the Internet, etc.). Smart devices A 250 and B 280 may include any number and type of large and small computing devices including, but not limited to, desktop computers, laptop computers, tablet computers, smartphones, etc., as described with reference to FIG. 1.

In the illustrated embodiment, smart devices A 250 and B 280 employ device geo-location software application ("geo-location application") 260A and 260B, respectively. Further, smart devices A 250 and B 280 are illustrated to be in communication with each other and geo-location mechanism 110 at the host machine over network 230; however, it is contemplated that smart devices A 250 and 280 are also capable of communicating with each other and other devices via a proximity network, such as proximity network 225 (e.g., Bluetooth, BLE, WiFi proximity, etc.). Geo-location application 260A and 260B may include a number of components, such as device and geo-location detection logic 262, registration and management logic 264, communication logic 266 having smart device module 268 and dumb device module 270, and user interface 272. Although, for the sake of brevity and clarity, geo-location application 260B is not shown here to have the aforementioned components, it is contemplated that geo-location application 260B may have the same or similar components as those of geo-location application 260A.

In one embodiment, smart devices A 250 and B 280 may communicate with any number and type of dumb devices over a proximity network, such smart device A 250 in communication with dumb device 240 over proximity network 225. It is contemplated that dumb device 240 may refer to or include any type or form of device conceivable that may not have the intelligence of a computing device but is able to employ a smart tag 242 (e.g., Bluetooth tag, etc.), allowing it have the ability to sufficiently communicate its geo-location and any other relevant information with smart device A 250. For example, dumb device 240 may include a purse, a dumb mobile phone, a Bluetooth headset, a wallet, a key or a set of keys, a pair of glasses, shoes, clothing item, a backpack, a suitcase, a painting, an electronic device, an automobile, a bicycle, a toy, a book, etc. Although certain devices may include a computer, the rest of the device (minus the computer) may still be regarded as dumb; for example, an automobile may include a computer, but the rest of the automobile may still be regarded as dumb.

In some embodiments, geo-location application 260A, 260B may be connectivity-enabled (e.g., CCF-enabled) and proximity-enabled (e.g., Bluetooth-enabled) to help identify and detect other participants or member devices (e.g., peer devices) and their geo-locations, such as smart device A 250 identifying and detecting smart device B 280 and dumb device 240 and their geo-location and vice versa. Similarly, geo-location mechanism 110 may also employ various communication, connectivity, and proximity techniques (e.g., CCF, Bluetooth, BLE, cloud networking, WiFi proximity, etc.) as provided by communication/compatibility logic 210 to identify, detect, manage as well as communicate with various devices, such as smart device A 250, smart device B 280, and dumb device 240. As aforementioned, CCF and Bluetooth are discussed throughout this document as examples for the sake of brevity, clarity, and ease of understanding, but it is to be noted that embodiments are not limited to CCF for connectivity or Bluetooth for proximity, etc., and that any number and type of other connectivity and proximity solutions/techniques may be employed and used.

In one embodiment, registration requests from smart devices A 250, B 280 may be received at reception/authentication logic 202. Upon receiving the requests, authentication of smart devices A 250, B 280, their users, the requests, etc., may be performed using any number and type of authentication techniques and information, such as by simply verifying user identification (user ID), password, private/public keys associated with smart devices A 250, B 280, etc. Upon completing the registration/authentication process, each smart device 250, 280 may be assigned a classification/status. Similar registration, authentication and classification processes may be performed between smart devices A 250 and B 280 so they may verify each other, assign classifications/status, and store any relevant information (e.g., classification/status, last known geo-location, etc.).

In embodiment, classifications or status may relate to the nature and amount of role each smart device 250, 280 accepts or is allowed to play based on, for example, theirs users relationship with each other. For example, once smart devices A 250 and B 280 have registered with geo-location mechanism 110, the two devices and their corresponding users achieve a basic level of membership and are classified as basic members or participants. Assuming the users of smart devices A 250 and B 280 are friends, being participants or using their basic membership, they are allowed to detect and track geo-locations of each other's smart devices as well as their own smart devices and dumb devices. For example, if user A is associated with smart device A 250 and user B is associated with smart device B 280, using the participant-level classification, smart device A 250 may track geo-location of smart device B 280, its own smart devices (such as any other smart devices (e.g., tablet computer, laptop computer, another smartphone, etc.) associated with user A), and any of its own dumb devices 240 (e.g., user A's keys, wallet, glasses, car, etc.).

Now, let us suppose user B is a trusting friend of or related to user A, such as user B is user A's wife. In that case, user A may request and/or allow user B to be his peer (as opposed to being a participant) and vice versa. Once the respective smart devices A 250 and B 280 are registered and classified as peers, the two devices are given special permission and privilege to detect and track each other's dumb devices 240. For example, having the peer-level classification, smart device A 250 may detect and track geo-locations of user B's purse and keys, etc., where smart device B 250 may detect and track geo-locations of user A's wallet and shoes, etc. The aforementioned membership classifications may be managed globally by member management logic 208 and stored at database 220. Similarly, these membership classifications may be managed locally by registration and management logic 264 and stored at local memory 274A, 274B.

In one embodiment, various tasks, such as detection, tracking, communicating, etc., may be performed at the device level, such as using various components of geo-location application 260A, 260B at smart devices A 250, B 280 and smart tag 242 at dumb device 240. For example, device and geo-location detection logic 262 at smart device A 250 may detect (e.g., using CCF-based technique, etc.) smart device B 280 via the device and geo-location detection logic of geo-location application 260B at smart device B 280 and vice versa. In one embodiment, the various tasks, such as detecting, tracking, communicating, etc., may be performed between smart device A 250 and B 280 via network 230 and/or network 225 (e.g., when within allowed proximity of each other). Upon detection of smart device B 280, the classification and the current geo-location of smart B 280 may also be detected by device and geo-location detection logic 262 which may then be used by registration and management logic 264 for tracking and evaluating purposes and subsequently, the geo-location and classification information is stored at local memory 274A. Further, any communication may be performed using smart device module 268 of communication logic 266 and their counterparts at smart device B 280, such as communication of geo-locations, classifications, and any other relevant information (e.g., notifications, requests, updates, etc.) between the two smart devices A 250, B 280, which may then be displayed using user interface 272 and its counterpart at smart device B 280.

With regard to dumb device 240, for example, smart device A 250 may communicate with dumb device 240 using dumb device module 270 and smart tag 242 (e.g. Bluetooth tag) at dumb device 240 over proximity network 225. Further, using device and geo-location detection logic 262 and smart tag 242, smart device A 250 may detect and track dumb device 240 and its current geo-location. This information may then be managed by registration and management logic 264 and stored at local memory 274 A.

Although, as discussed above, most tasks may be performed based on device-device communication, in some embodiment, geo-location mechanism 110 may be used to facilitate and perform any number and type of tasks. For example, in some embodiments, smart device A 250 may communicate with geo-location mechanism 110, over network 230 and via smart device module 268 and communication/compatibility logic 210, to request or trigger (under certain predefined events, such as battery at smart device A 250 dies, connection is lost, etc.) geo-location detection and management logic 206 to detect and register the geo-location, classification, etc., relating to smart device B 280, etc. Any range of data (e.g., last known geo-locations, classifications, etc.) and metadata relating to devices 250, 280, 240 may be maintained by member management logic 206 and stored at database 220. Once the geo-location is detected, it may be communicated back to smart device A 250 over network 230 and via smart device module 268 and communication/compatibility logic 210. Similarly, communication between smart device B 280 and geo-location mechanism 110 may be maintained.

Communication/compatibility logic 210 may be used to facilitate dynamic communication and compatibility between various computing device, such as host machine 100 of FIG. 1, client computing devices 250, 280 (e.g., mobile computing device), etc., databases, such as database 220, and networks, such as network 230 (e.g., Internet, cloud-computing network, etc.) and proximity network 225 (Bluetooth, BLE, WiFi proximity, etc.), etc., websites, (e.g., social networking websites, such as Facebook®, LinkedIn®, Google+®, etc.), etc., while ensuring compatibility with changing technologies, parameters, protocols, standards, etc.

It is contemplated that any number and type of components may be added to and/or removed from geo-location mechanism 110 and geo-location application 260A, 260B to facilitate various embodiments including adding, removing, and/or enhancing certain features. For brevity, clarity, and ease of understanding of geo-location mechanism 110 and geo-location application 260A, 260B, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
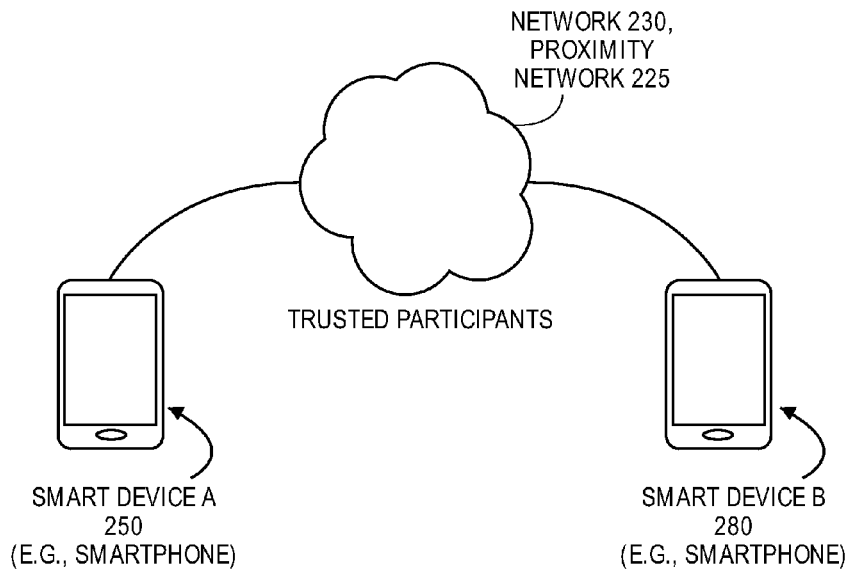
FIGS. 2B-2D illustrate various scenarios for dynamic detection and communication of geo-locations for devices according to one embodiment.
Figure 2C:
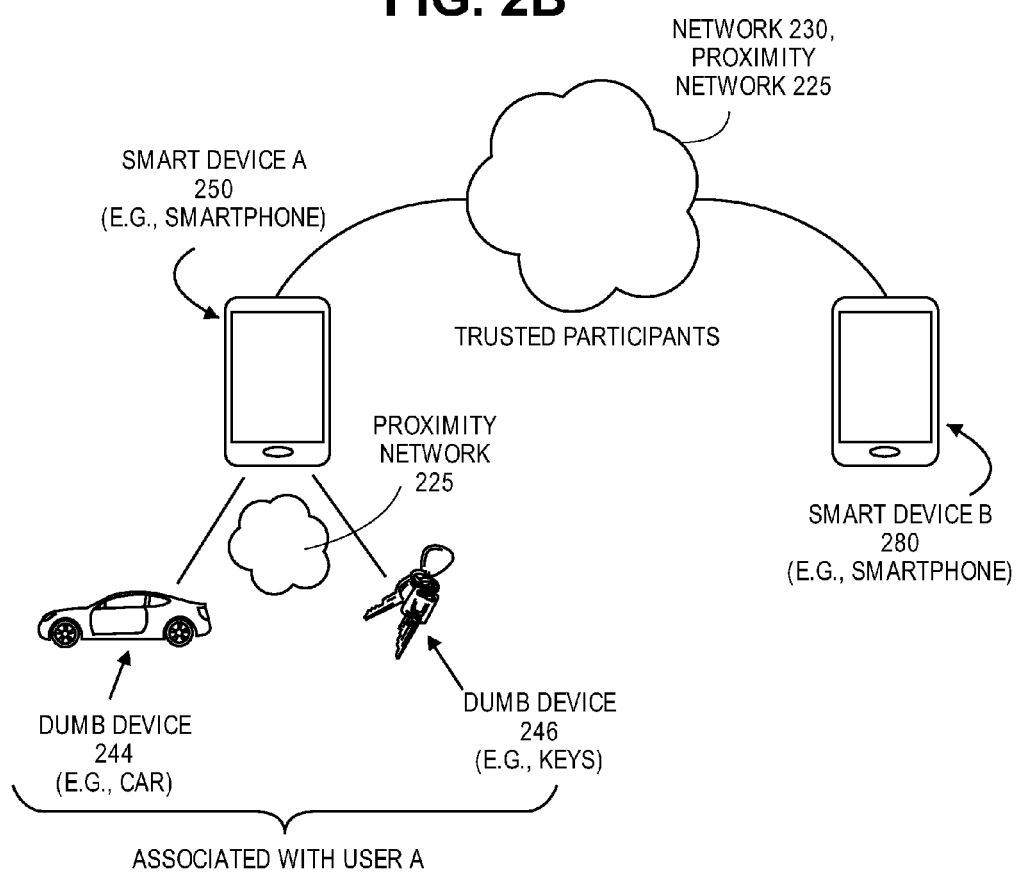
Figure 2D:
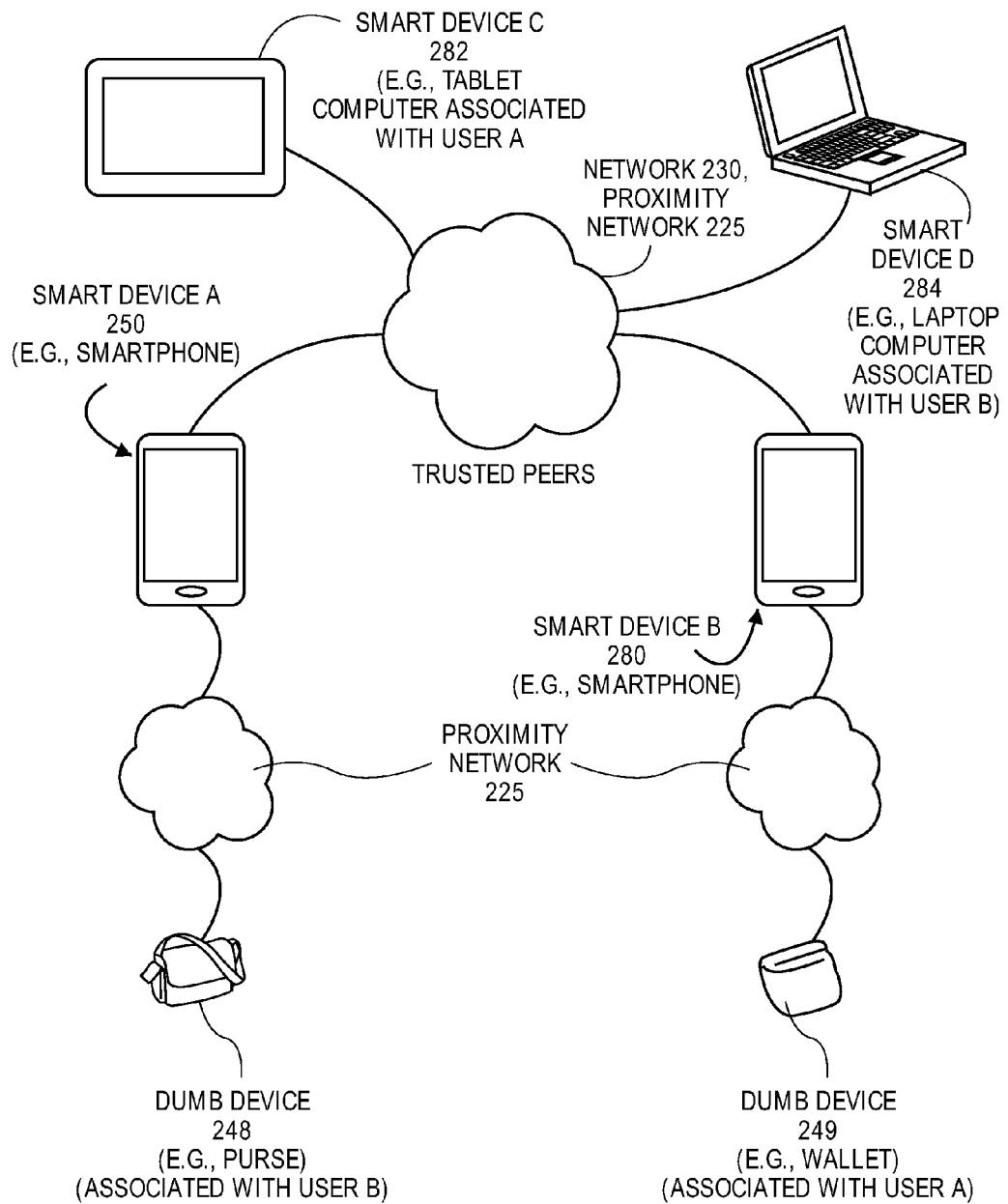

FIGS. 2B-2D illustrate various scenarios for dynamic detection and communication of geo-locations for devices according to one embodiment. FIG. 2B illustrates two smart devices A 250 and B 280 having employed geo-location applications 260A and 260B, as described with reference to FIG. 2A, are in communication with each other over network 230 and/or proximity network 225. The two smart devices 250, 280 are classified as trusted participants and are able to exchange their location data (including their precise geo-locations, etc.). This exchange of data may take place over network 230 (e.g., cloud network, etc.), if the two smart devices 250, 280 are sufficient far from each other, or proximity network 225 (e.g., Bluetooth, WiFi Proximity, etc.) if the two smart devices 250, 280 are within an allowable proximity of each other. The location data is recorded and stored by each smart device 250, 280 at their respective local memory 274A, 274B. This way, in one embodiment, if the two smart devices 250, 280 are disconnected for some reason (such as one of them is lost or loses battery life or network connection, etc.), each smart device 250, 280 will know the last know geo-location of the other smart device 250, 280, such as smart device B 280 will know the last geo-location of smart device A 250 and vice versa.

Now referring to FIG. 2C, it illustrates another scenario where two smart devices A 250 and B 280 are in communication with each other over networks 230, 225. For brevity and clarity, the components and features already described above with regard to FIGS. 1, 2A and 2B are not repeated or described here. In the illustrated embodiment, smart device A 250 is further shown to be in communication with a couple of dumb devices 242, 244, such as dumb device 240 of FIG. 2A, employing smart tags, such as smart tag 242 (e.g., Bluetooth, BLE, WiFi proximity, RFID, etc.) of FIG. 2A. In one embodiment, the two smart devices 250, 280 may exchange and record each other's location data while, in another embodiment, smart device A 250 may also detect and record geo-locations of the two dumb devices 244 (e.g., car) and 246 (e.g., keys) by, for example, monitoring the proximity connection via the smart tags over proximity network 225. This location information can then be used by user A of smart device A 250 to locate keys 246 (if, for example, lost or misplaced) and car 244 (if, for example, user A forgets where car 244 was parked).

For example and in one embodiment, user A does not have to type in or mark the parking location at the time of parking, but that smart device A 250 automatically detects and records the geo-location (e.g., parking location/spot) of car 244 at the time of parking which can then be used by user A to find car 244, where the user may view, via interface 272, the parking location by simply checking it with geo-location application 260A. Further, in one embodiment, since the two smart devices A 250, B 280 are classified as trusted participants, smart device B 280 may not be afforded the privilege of monitoring or detecting location data relating to dumb devices 244, 246.

In FIG. 2D, smart devices A 250 and B 280 are connected, over network 230, 225, as trusted peers and accordingly, they are given additional privileges. There may be any number and type of reasons for users to become or register as trusted peers, such as for being in a close personal relationship with each other as friends, neighbors, colleagues, spouses, siblings, parents-children, etc. For example, two more smart devices C 282 (e.g., tablet computer associated with user A of smart device A 250) and D 284 (e.g., laptop computer associated with user B of smart device B 280) be added over network 230, 225 and for being trusted peers, all four smart devices A 250, B 280, C 282 and D 284 may exchange location data with each other so that any one smart device A 250, B 280, C 282 and D 284 can locate any other smart device A 250, B 280, C 282 and D 284.

Similarly, in one embodiment, smart devices A 250 and B 280 may be given the privilege of monitoring and locating each other's dumb devices 248, 249 over proximity network 225. Each dumb device 248, 249 may employ a smart tag, such as smart tag 242 of FIG. 2A. For example, the husband's smart device A 250 may monitor, via the smart tag, the proximity connection with the wife's dumb device 248 (e.g., purse), while the wife's smart device B 280 may monitor, via the smart tag, the proximity connection with the husband's dumb device 249 (e.g., wallet). Let us suppose that upon reaching the airport, the husband realizes he does not have his wallet 249. In this case, he may log into geo-location application 260A on his smart device A 250 to check the last known location of his wallet 249; however, given that his smart device A 250 is not within the allowable proximity of wallet 249, its location cannot be confirmed and so the husband may choose to confirm that with his wife's smart device B 280.

In one embodiment, using smart device module 268 of communication logic 266, the husband may connect with his wife's smart device B 280 using his own smart device A 250 to query the current geo-location of wallet 249. If wallet 249 is home and within the proximity of smart device B 280, smart device B 280 detect and record the geo-location of wallet 249 and communicate it back to smart device A 250, such as via a notification message (e.g., audio, video, text, etc.) to be provided via user interface 272 at smart device A 250.

Figure 3:
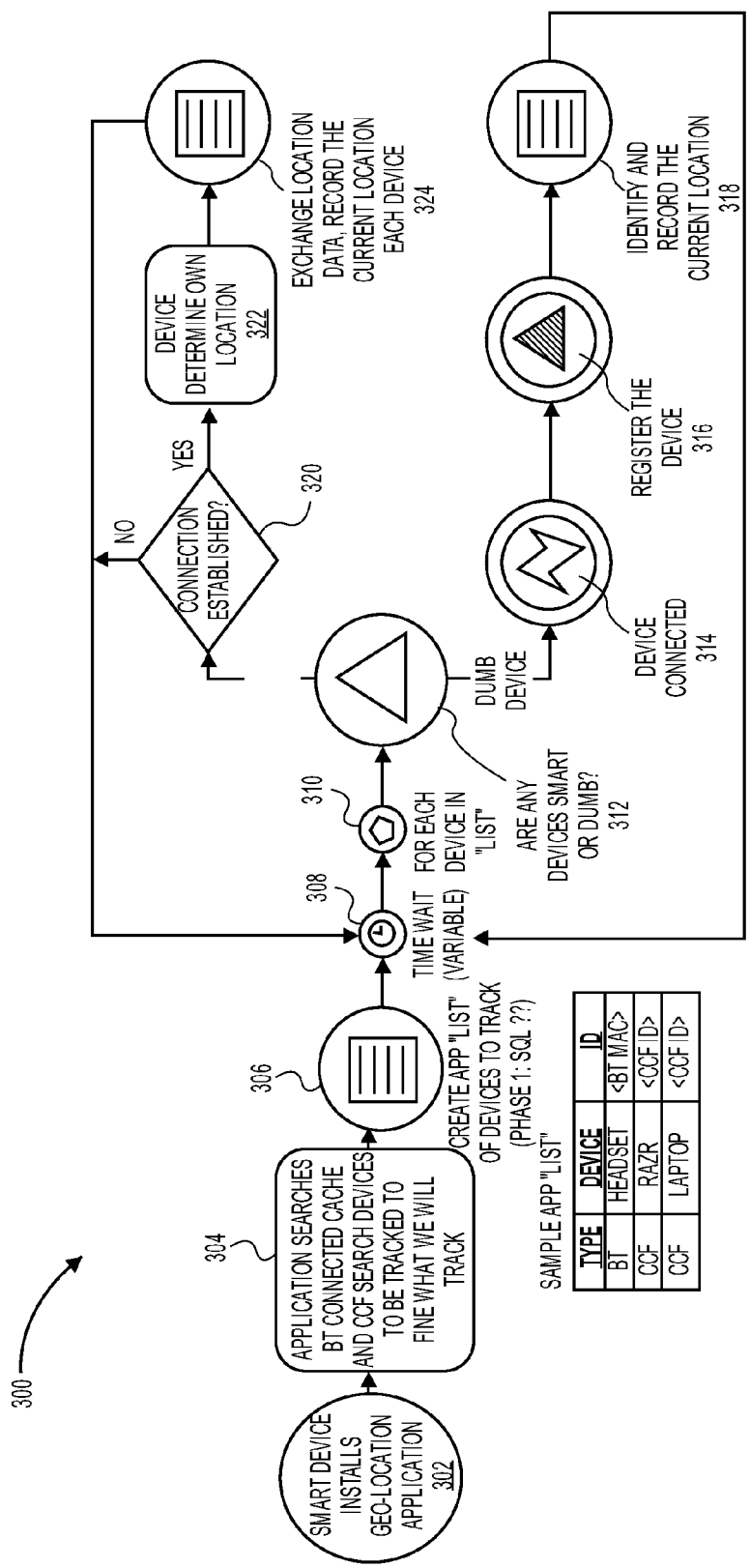
FIG. 3 illustrates a method for facilitating dynamic detection and communication of geo-locations for devices according to one embodiment.

FIG. 3 illustrates a method 300 for facilitating dynamic detection and communication of geo-locations for devices according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by geo-location mechanism 110 and/or geo-location application 260A, 260B of FIG. 2A.

Method 300 begins at block 302 with a smart device installing geo-location application 260A, 260B (e.g., CCF-based application) of FIG. 2A. At block 304, using the installed geo-location application and/or geo-location mechanism 110 at a server computer, such as host machine 100 of FIG. 1, a search is performed for proximity connected cache (e.g., Bluetooth) and connectivity (e.g., CCF connectivity) to find devices (e.g., dumb devices, other smart devices) that the smart device can track. In some embodiments, this may be done by having a user type in a command, such as "search my devices", etc., via a user interface provided by the geo-location application on the smart device. At block 306, a list of devices to be tracked is prepared and maintained by geo-location application at the smart device and/or geo-location mechanism at the host machine.

After a reasonable time wait at block 308, for each device on the list at block 310, a determination is made as to whether one of the devices is a smart "peer" or "participant" device or a dumb device at block 312. If one of the devices is determined to be a dumb device, at block 314, it is connected to the smart device, over proximity network, via a smart tag placed on the dumb device. At block 316, the dumb device is registered, while, at block 318, the dumb device's current location is identified and recorded and then stored at the smart device and/or the host machine.

Referring back to block 312, a determination is made as to whether one of the devices is a smart peer/participant device and if it is, at block 320, a determination is made as to whether a connection can be made with the trackable smart device. If not, the process returns to wait at block 308. If yes, at block 322, the connection is made between the smart device and the trackable smart device via communication logic at the two smart devices, over a network (e.g., cloud network). At block 324, any location data (e.g., current geo-location) is exchanged between the two smart devices and so each smart device now knows the current or last known location of the other smart device. This location data is recorded and then stored at each of the smart devices and/or the host machine.

Figure 4:
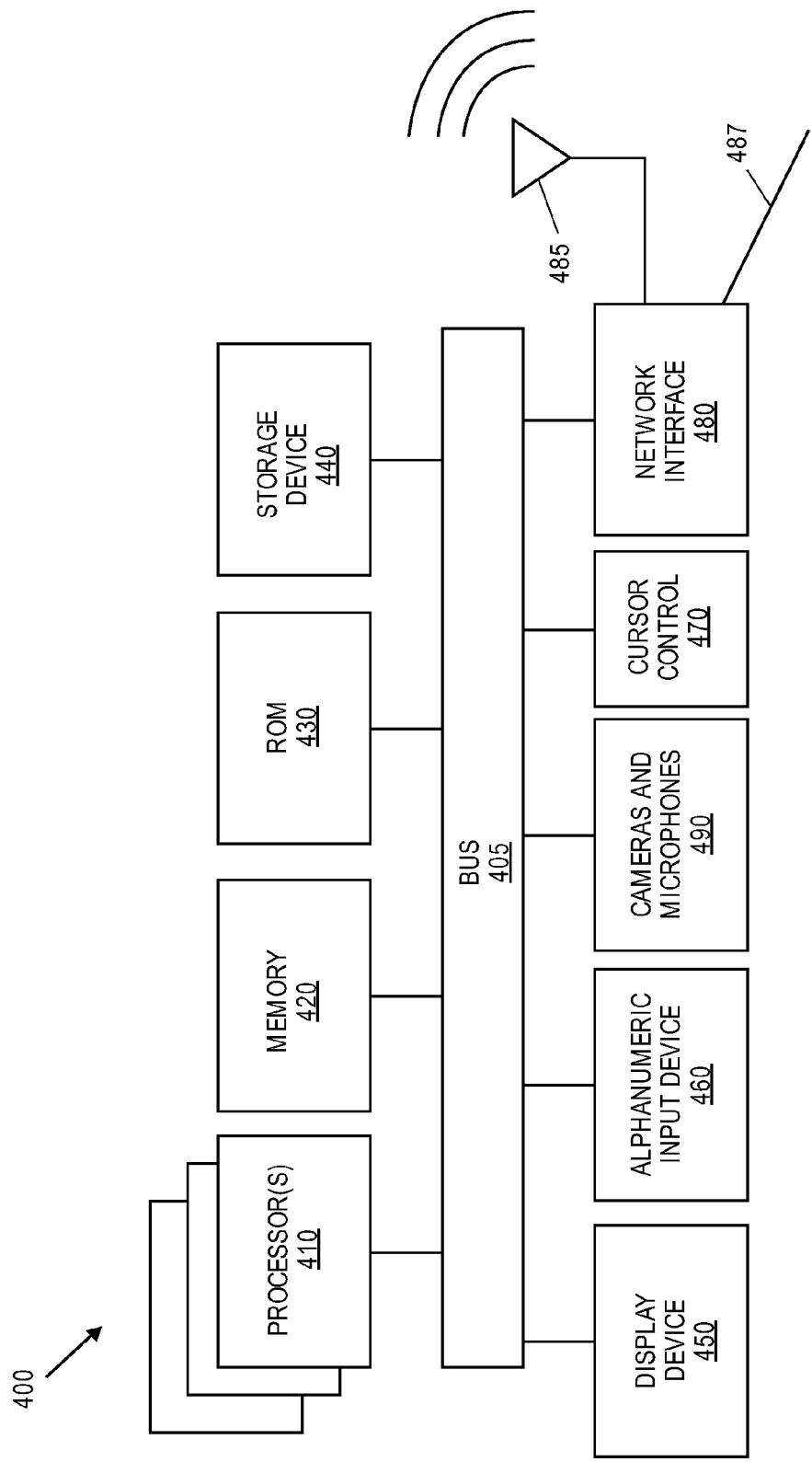
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100, employing geo-location mechanism 110, of FIG. 1 and/or smart device 250, 260, employing geo-location application 260A, 260B, of FIG. 2A.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: tracking, at a first smart device, one or more devices including a second smart device, wherein the first and second smart devices include a computing device; establishing a first connection with the second smart device, wherein establishing comprises exchanging first location data between the first smart device and the second smart device, wherein establishing further comprises communicating a first current location associated with the first smart device to the second smart device; and identifying a second current location associated with the second smart device, wherein the second current location is initially recorded and iteratively rewritten at a first local memory of the first smart device.

Embodiments or examples include any of the above methods wherein exchanging comprises communicating a first current location of the first smart device to the second smart device, wherein the first current location is recorded at a second local memory of the second smart device.

Embodiments or examples include any of the above methods wherein the connection between the first smart device and a second smart device is established via a smart device module and over a network comprising a cloud network.

Embodiments or examples include any of the above methods further comprising establishing a second connection with a dumb device and to retrieve second location data from the dumb device, wherein the second connection between the first smart device and the dumb device is established, over a proximity network, via the smart device module at the first smart device and a smart tag at the dumb device.

Embodiments or examples include any of the above methods further comprising identifying, using the second location data, a dumb current location associated with the dumb device, wherein the dumb current location is recorded at the first local memory of the first smart device.

Embodiments or examples include any of the above methods further comprising determining a classification associated with the second smart device, wherein the second smart device is classified as at least one of a participant device or a peer device.

Embodiments or examples include any of the above methods further comprising extending special privileges to the second smart device if the second smart device is classified a the peer, wherein the special privileges include facilitating the second smart device to detect and maintain the dumb current location associated with the dumb device, wherein the dumb device is associated with the first smart device.

Some embodiments pertain to a method comprising: receiving, at a server computing device, a registration request from a first smart device, the smart device including a computing device; registering the first smart device as one of a plurality of smart devices serving as members, wherein registering includes classifying the first smart device as participant or peer; geo-location detection and management logic to detect location data associated with the first smart device and a second smart device of the plurality of smart devices; and communication/compatibility logic to facilitate communication between the first smart device and a second smart device, wherein communication includes sharing the location data between the first and second smart devices.

Embodiments or examples include any of the above methods wherein the location data comprises a first current location associated with the first smart device, and a second current location associated with the second smart device.

Embodiments or examples include any of the above methods wherein sharing comprises facilitating the first smart device to receive the second current location associated with the second smart device, and the second smart device to receive the first current location associated with the first smart device.

Embodiments or examples include any of the above methods further comprising maintaining one or more of a list of the plurality of smart devices, classifications associated with the plurality of smart devices, and the location data.

Another embodiment or example incudes an apparatus to carry out operations according to any of the methods mentioned above.

In another embodiment or example, an apparatus comprises means for carrying out operations according to any of the methods mentioned above.

In yet another embodiment or example, a computing device arranged to carry out operations according to any of the methods mentioned above.

In one embodiment or example, a system comprises a mechanism to carry out operations according to any of the methods mentioned above.

In yet another embodiment or example, at least one machine-readable storage medium comprising a plurality of instructions that in response to being executed on a computing device, causes the computing device to carry out operations according to any of the methods mentioned above.

In yet another embodiment or example, at least one non-transitory or tangible machine-readable storage medium comprising a plurality of instructions that in response to being executed on a computing device, causes the computing device to carry out operations according to any of the methods mentioned above.

Some embodiments pertain to an apparatus comprising: device and geo-location detection logic, at a first smart device, to track one or more devices including a second smart device, wherein the first and second smart devices include a computing device; communication logic to establish a first connection with the second smart device, and wherein the communication logic to exchange first location data between the first smart device and the second smart device, wherein the communication logic is further to communicate a first current location associated with the first smart device to the second smart device; and registration and management logic to identify a second current location associated with the second smart device, wherein the second current location is initially recorded and iteratively rewritten at a first local memory of the first smart device.

Embodiments or examples include the above apparatus wherein the exchange of the first location data comprises communicating a first current location of the first smart device to the second smart device, wherein the first current location is recorded at a second local memory of the second smart device.

Embodiments or examples include the above apparatus wherein the connection between the first smart device and a second smart device is established via a smart device module and over a network comprising a cloud network.

Embodiments or examples include the above apparatus wherein the communication logic is further to establish a second connection with a dumb device and to retrieve second location data from the dumb device, wherein the second connection between the first smart device and the dumb device is established, over a proximity network, via the smart device module at the first smart device and a smart tag at the dumb device.

Embodiments or examples include the above apparatus wherein the registration and management logic is further to identify, using the second location data, a dumb current location associated with the dumb device, wherein the dumb current location is recorded at the first local memory of the first smart device.

Embodiments or examples include the above apparatus wherein the registration and management logic is further to determine a classification associated with the second smart device, wherein the second smart device is classified as at least one of a participant device or a peer device.

Embodiments or examples include the above apparatus wherein the registration and management logic is further to extend special privileges to the second smart device if the second smart device is classified a the peer device, wherein the special privileges include facilitating the second smart device to detect and maintain the dumb current location associated with the dumb device, wherein the dumb device is associated with the first smart device.

Some embodiments pertain to an apparatus comprising: reception/authentication logic to receive a registration request from a first smart device, the smart device including a computing device; registration/classification logic to register the first smart device as one of a plurality of smart devices serving as members, wherein registering includes classifying the first smart device as participant or peer; geo-location detection and management logic to detect location data associated with the first smart device and a second smart device of the plurality of smart devices; and communication/compatibility logic to facilitate communication between the first smart device and a second smart device, wherein communication includes sharing the location data between the first and second smart devices.

Embodiments or examples include the above apparatus wherein the location data comprises a first current location associated with the first smart device, and a second current location associated with the second smart device.

Embodiments or examples include the above apparatus wherein sharing comprises facilitating the first smart device to receive the second current location associated with the second smart device, and the second smart device to receive the first current location associated with the first smart device.

Embodiments or examples include the above apparatus further comprising member management logic to maintain one or more of a list of the plurality of smart devices, classifications associated with the plurality of smart devices, and the location data.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   device and geo-location detection logic, at a first smart device, to detect a second smart device wherein the second smart device is detected based on proximate separation of the first smart device from the second smart device, wherein the proximate separation indicates one or more points of separations between the first smart device and the second smart device, wherein a point of separation precisely indicates, in time and location, where the second smart device is separated from the first smart device; and
   communication logic to continously establish and maintain real-time communication between the first smart device and the second smart device, wherein the communication to facilitate real-time exchange of smart location data between the first smart device and the second smart device, wherein the exchange comprises forwarding of a first device location of the first smart device to the second smart device and receiving of a second device location of the second smart device upon reaching each point of separation, wherein the first and second device locations to reveal a last point of separation indicating a last point in time or a last physical location where the second smart device loses communication with the first smart device,
   wherein the device and geo-location detection logic is further to search and detect the second smart device based on the last separation point, and
   wherein the communication logic is further to reestablish real-time contact between the first smart device and the second smart device.

2. The apparatus of claim 1, further comprising registration and management logic to record the first device location at the second smart device and the second device location at the first smart device, wherein the real-time communication between the first smart device and the second smart device is established over a network comprising one or more of a cloud network, a proximity network, and the Internet, and
   wherein the registration and management logic is further to register the first and second smart devices and the first and second data locations, respectively, wherein the first and second smart devices include computing devices.

3. The apparatus of claim 1, wherein the communication logic is further to establish communication between the first smart device and a dumb device and to retrieve a dumb device location from the dumb device, wherein the communication between the first smart device and the dumb device is established, over a proximity network, using a smart device module at the first smart device and a smart tag at the dumb device, wherein the dumb device includes at least one of a dumb cellphone, a key, a book, a car, a purse, and a wallet.

4. The apparatus of claim 3, wherein the registration and management logic is further to recorded the dumb device location at the first smart device.

5. The apparatus of claim 4, wherein the registration and management logic is further to classify the second smart device and the dumb device as at least one of participant devices or peer devices.

6. The apparatus of claim 4, wherein the registration and management logic is further to extend special privileges to the second smart device if the second smart device is classified as a peer device, wherein the special privileges include facilitating the second smart device to detect and maintain the dumb location associated with the dumb device on behalf of the first smart device such that the first smart device to leverage and outsource one or more tasks relating to detecting and maintaining of the dumb location to the second smart device.

7. A method comprising:
  detecting, at a first smart device, a second smart device, wherein the second smart device is detected based on proximate separation of the first smart device from the second smart device, wherein the proximate separation indicates one or more points of separations between the first smart device and the second smart device, wherein a point of separation precisely indicates, in time and location, where the second smart device is separated from the first smart device;
  continously establishing and maintaining real-time communication between the first smart device and the second smart device, wherein the communication to facilitate real-time exchange of smart location data between the first smart device and the second smart device, wherein the exchange comprises forwarding of a first device location of the first smart device to the second smart device and receiving of a second device location of the second smart device upon reaching each point of separation, wherein the first and second device locations to reveal a last point of separation indicating a last point in time or a last physical location where the second smart device loses communication with the first smart device;
  searching and detecting the second smart device based on the last separation point; and
  reestablishing real-time contact between the first smart device and the second smart device.

8. The method of claim 7, further comprising:
  recording the first device location at the second smart device and the second device location at the first smart device, wherein the real-time communication between the first smart device and the second smart device is established over a network comprising one or more of a cloud network, a proximity network, and the Internet; and
  registering the first and second smart devices and the first and second data locations, respectively, wherein the first and second smart devices include computing devices.

9. The method of claim 7, further comprising establishing communication between the first smart device and a dumb device and to retrieve a dumb device location from the dumb device, wherein the communication between the first smart device and the dumb device is established, over a proximity network, using a smart device module at the first smart device and a smart tag at the dumb device, wherein the dumb device includes at least one of a dumb cellphone, a key, a book, a car, a purse, and a wallet.

10. The method of claim 9, further comprising recording the dumb device location at the first smart device.

11. The method of claim 10, further comprising classifying the second smart device and the dumb device as at least one of participant devices or peer devices.

12. The method of claim 10, further comprising extending special privileges to the second smart device if the second smart device is classified as a peer device, wherein the special privileges include facilitating the second smart device to detect and maintain the dumb location associated with the dumb device on behalf of the first smart device such that the first smart device to leverage and outsource one or more tasks relating to detecting and maintaining of the dumb location to the second smart device.

13. At least one non-transitory machine-readable medium comprising instructions which, when executed by a computing device, cause the computing device to:
  detect, at a first smart device, a second smart device, wherein the second smart device is detected based on proximate separation of the first smart device from the second smart device, wherein the proximate separation indicates one or more points of separations between the first smart device and the second smart device, wherein a point of separation precisely indicates, in time and location, where the second smart device is separated from the first smart device;
  continously establish and maintain real-time communication between the first smart device and the second smart device, wherein the communication to facilitate real-time exchange of smart location data between the first smart device and the second smart device, wherein the exchange comprises forwarding of a first device location of the first smart device to the second smart device and receiving of a second device location of the second smart device upon reaching each point of separation, wherein the first and second device locations to reveal a last point of separation indicating a last point in time or a last physical location where the second smart device loses communication with the first smart device;
  search and detect the second smart device based on the last separation point; and
  reestablish real-time contact between the first smart device and the second smart device.

14. The non-transitory machine-readable medium of claim 13, wherein the computing device is further to:
  record the first device location at the second smart device and the second device location at the first smart device, wherein the real-time communication between the first smart device and the second smart device is established over a network comprising one or more of a cloud network, a proximity network, and the Internet; and
  register the first and second smart devices and the first and second data locations, respectively, wherein the first and second smart devices include computing devices.

15. The non-transitory machine-readable medium of claim 13, wherein the computing device is further to establish communication between the first smart device and a dumb device and to retrieve a dumb device location from the dumb device, wherein the communication between the first smart device and the dumb device is established, over a proximity network, using a smart device module at the first smart device and a smart tag at the dumb device, wherein the dumb device includes at least one of a dumb cellphone, a key, a book, a car, a purse, and a wallet.

16. The non-transitory machine-readable medium of claim 15, wherein the computing device is further to record the dumb device location at the first smart device.

17. The non-transitory machine-readable medium of claim 16, wherein the computing device is further to classify the second smart device and the dumb device as at least one of participant devices or peer devices.

18. The non-transitory machine-readable medium of claim 16, wherein the computing device is further to extend special privileges to the second smart device if the second smart device is classified as a peer device, wherein the special privileges include facilitating the second smart device to detect and maintain the dumb location associated with the dumb device on behalf of the first smart device such that the first smart device to leverage and outsource one or more tasks relating to detecting and maintaining of the dumb location to the second smart device.

\* \* \* \* \*